T. CONNOR.
Spoke-Tenoning Machines.
No. 224,393. Patented Feb. 10, 1880.
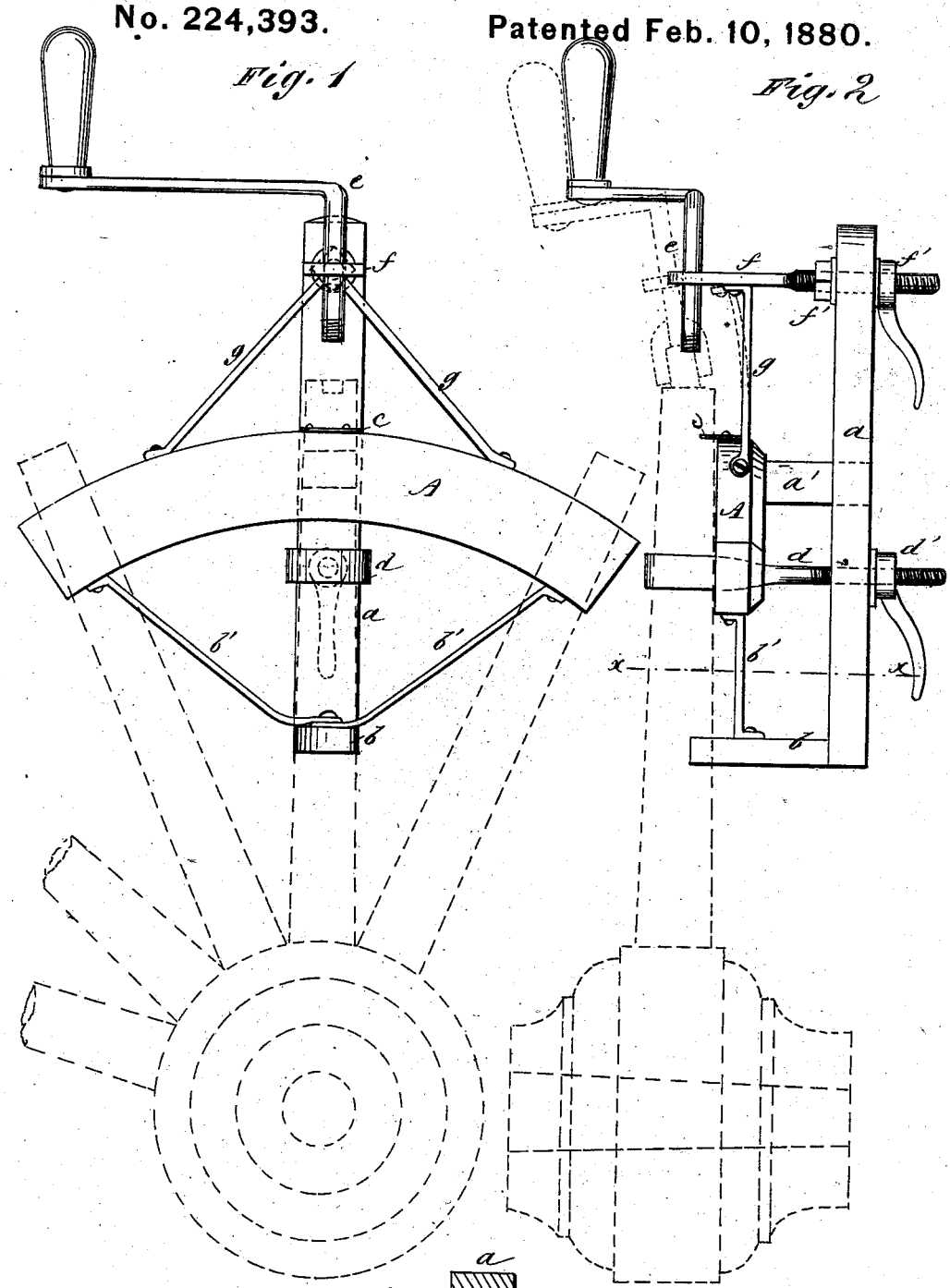

UNITED STATES PATENT OFFICE.

TARRENCE CONNOR, OF LEAVENWORTH, INDIANA.

SPOKE-TENONING MACHINE.

SPECIFICATION forming part of Letters Patent No. 224,393, dated February 10, 1880.

Application filed September 16, 1879.

*To all whom it may concern:*

Be it known that I, TARRENCE CONNOR, of Leavenworth, in the county of Crawford and State of Indiana, have invented a new and Improved Spoke-Tenoning Machine, of which the following is a specification.

My improvements relate to machines adapted for attachment to the spokes and fitted with cutting devices for reducing the ends of the spokes to the required size for entering the mortises of the fellies; and the object of the invention is to obtain a simple, light, and convenient apparatus which will accomplish the work named with accuracy and rapidity.

The construction and operation will be more particularly described with reference to the annexed drawings, and the invention pointed out in the claims.

In the drawings, Figure 1 is a plan view of the machine as applied to use. Fig. 2 is a side view of the same. Fig. 3 is a cross-section on line $x\ x$ of Fig. 2.

Similar letters of reference indicate corresponding parts.

The piece A, which I term the "sill," is made as a segment of a circle. To this piece A, midway of its ends, the bar $a$ is attached rigidly by the piece $a'$, and in the direction radial of the segment. At the inner end of bar $a$ a short standard, $b$, projects, the end of which is rounded out to lie against the side of a spoke, and the standard $b$ is rigidly braced by braces $b'$, that pass from it in opposite directions to the outer ends of the sill A. Upon the upper side of A is a curved rest, $c$, formed with or attached to the sill A, for receiving the spoke, the rest $c$ being placed so that the spoke resting in it and against standard $b$ will extend in the direction of bar $a$, and be parallel, or nearly so, therewith.

The bar $a$, between sill A and standard $b$, carries a screw-rod, $d$, having an eye at one end for the spoke to pass through, and fitted at the other end with a nut, $d'$, so that the spoke may be clamped tightly upon the standard $b$ and rest $c$.

The above-described parts constitute the head or frame adapted for application upon the end of a spoke in the manner as indicated and as shown in the drawings.

The two spokes adjoining the one to which the device is attached will rest against sill A, and serve to prevent the spoke twisting by the action of the cutters.

The crank-shaft $e$ for carrying the auger or cutter is supported by the arm $f$, that projects from the outer end of bar $a$. The end of $f$ passing through bar $a$ is formed with a screw-thread, and fitted with set-nuts $f'$ at each side of bar $a$, so that the arm may be set in and out as required, and clamped rigidly.

The arm $f$ is braced against lateral movement by divergent rods $g\ g$, extending to the sill A, upon opposite sides of the center, and the crank-shaft $e$, which bears the hollow cutter-head, passes loosely through an aperture in the end of arm $f$, which latter acts as a guide to hold the crank-shaft in proper position while cutting the tenon.

As the cutter-head in this kind of a machine is hollow, or made to encompass the end of the spoke, it will be seen that no stiff or fixed bearing in arm $f$ is required, but only an aperture to hold the crank-shaft in the proper axial line of rotation, the spoke itself being relied on to center the tenon.

As the spokes of a wheel are inserted with a dish which varies with different wheels, it is necessary to form the tenon at varying angles to the axial line of the spoke in order to make the felly and tire set squarely on the dished spokes. For this purpose it is necessary to alter the axis of rotation of crank-shaft $e$. The brace-rods $g$ are consequently made slightly elastic, and the arm $f$ is made longitudinally adjustable by having its end which passes through bar $a$ threaded and clamped in its adjustment by nuts $f'\ f'$ upon opposite sides of the bar $a$. This permits the crank-shaft to be adjusted into the position shown in dotted lines, which, it will be seen, allows the tenon to be cut at an angle to correct the dish of the wheel.

The frame of the machine will preferably be made of wood to render it light.

It will be seen that the machine is simple and durable, and may be operated with great facility and convenience.

Having thus described my invention, what I claim as new, and desire to secure by Letters Patent, is—

1. The improved spoke-tenoning machine, consisting of the sill-piece A, having a rest, c, and adapted to overlap the adjacent spokes, as described, the bar a, standard b, clamping-screw d, arm f, and crank-shaft e, adapted for receiving the cutter or auger, combined for operation substantially as described and shown.

2. The combination, in a spoke-tenoning machine, of a spoke-clamping frame, the elastic rods g g, and the guide-arm f, carrying the cutter-head shaft, the said arm being rigidly connected with brace-rods g g, and made longitudinally adjustable, substantially as and for the purpose described.

TARRENCE CONNOR.

Witnesses:
GEORGE H. CONNOR,
S. M. JENNER.